United States Patent [19]
Wilhelms et al.

[11] 3,756,552
[45] Sept. 4, 1973

[54] VEHICLE SEAT SUPPORT

[75] Inventors: Gerhard Wilhelms, Kreiensen; Werner Stichnoth, Westerhof, both of Germany

[73] Assignee: Fa. Carl Bruns Werkzeufabrik GmbH, Kreiensen, Germany

[22] Filed: Mar. 6, 1972

[21] Appl. No.: 232,109

[30] Foreign Application Priority Data
Nov. 16, 1971 Germany.................. P 21 56 786.2

[52] U.S. Cl. ............................................. 248/399
[51] Int. Cl. ....................... B60n 1/02, F16m 13/00
[58] Field of Search..................... 248/399, 400, 401

[56] References Cited
UNITED STATES PATENTS
| | | | |
|---|---|---|---|
| 2,630,854 | 3/1953 | Neher | 248/399 |
| 2,840,140 | 6/1958 | Harrington | 248/400 |
| 3,006,593 | 10/1961 | Plate et al. | 248/399 |
| 3,215,386 | 11/1965 | Swenson | 248/400 |
| 3,412,967 | 11/1968 | Swenson et al. | 248/400 |
| 3,493,211 | 2/1970 | Barecki et al. | 248/399 |
| 3,593,953 | 7/1971 | Auer | 248/400 |
| 3,608,855 | 9/1971 | Osenberg | 248/400 |

FOREIGN PATENTS OR APPLICATIONS
994,608  6/1965  Great Britain..................... 248/399

Primary Examiner—Marion Parsons, Jr.
Attorney—Raymond E. Fidler et al.

[57] ABSTRACT

A seat support incorporates a parallelogram linkage pivotally connected between the seat and a base support member for pivotal movement in a fore and aft direction, a compression spring positioned between the seat and the base, and an adjustment spindle rotatably mounted in the seat for adjusting the bias on the spring for regulating the effective stiffness of the seat support.

6 Claims, 4 Drawing Figures

PATENTED SEP 4 1973 3,756,552

VEHICLE SEAT SUPPORT

BACKGROUND OF THE INVENTION

The invention relates to a vehicle seat support having a seat frame supported by a parallelogram linkage, and a suspension unit consisting of a compression spring and a shock absorber associated with the parallelogram linkage. The suspension unit is hinged at one end to a parallelogram link and positioned in parallel guide slits at the other end, which other end is adjustable by a threaded spindle for regulating the variable spring force.

The regulation of the spring force by adjusting the suspension unit with the aid of the threaded spindle may be used to match the suspension of the vehicle seat to loads of different weight. Displacement of the end of the suspension unit guided in the guide slits causes a shortening or lengthening of the suspension unit from which the different spring forces arise.

In a vehicle seat of this general type already known in the prior art, the suspension unit is joined at a separate hinge point to the upper parallelogram guide rod facing the seat frame, and the guide slits for the other end of the suspension unit are fixedly arranged at the foot of the seat. Furthermore, the spindle axis and the guide slits extend approximately in the same direction and the spindle extends forwardly from the seat foot. The guide slits, the threaded spindle and the axis of the suspension unit form at least approximately a right angle in the various adjustment positions. A long adjustment movement from the locally positioned end of the suspension unit and thus of the threaded spindle are required for adjusting the spring force so that the threaded spindle has to have a considerable length and must be composed of two separate interfitting spindles which introduces a stroke conversion factor. The mounting and control on the seat base and the adjustment thereof described require an expensive construction, the expense of which is increased by the provision of the separate hinge position for the suspension unit. A further disadvantage is that owing to the control arrangement, hearing and adjustment of the suspension unit on the seat base, this seat base must always be arranged at the front in the seating direction, in order on the one hand to achieve the necessary parallelogram linkage operation with the suspension unit and on the other hand to permit adjustment of the spring force in the seat region. However, this causes a very unsatisfactory protrusion of the seat base position with a spindle projecting therefrom, which substantially impairs the comfort of the vehicle driver and may even create a hazard.

The invention is concerned with the provision of a vehicle seat support of the type mentioned which avoids the disadvantages of the known vehicle seat support and by which a very simple construction with simple components is possible on the one hand and by which on the other hand an adjustment of the spring force can be achieved with a small adjustment path and without having a disturbing effect on the seat conditions, It is also obtained with this possibility of adjustment that the seat base can nevertheless be arranged at the back in relation to the seat direction, so that the vehicle seat can pivot freely towards the front.

SUMMARY OF THE INVENTION

The invention accordingly provides a vehicle seat support comprising a seat frame carried by a parallelogram link-age and a suspension unit comprising a compression spring and a shock absorber, the suspension unit being arranged to co-operate with the parallelogram linkage and having one end connected to a parallelogram mount and the other end supported in parallel bearing slots for adjustment by a threaded spindle for selection of different spring forces, the suspension unit being supported at the one end on the base of the seat with the bearing slots for the other end of the suspension unit arranged in the region of the front edge of the seat on the seat frame and extending from this seat edge rearwardly and downwardly at an acute angle to the plane of the seat frame, the end of the suspension unit guided in the guide slots being braced against an inclined plane displaceable by the screw spindle which is positioned in the front edge of the seat frame, and the inclination of the plane opposing the inclination of the guide slot while making an acute angle with the plane of the seat frame.

A very simple form of construction is thus achieved. A separate hinge portion for the suspension unit on the parallel-ogram linkage and thus a separate and necessarily expensive construction for providing the hinge portion are dispensed with. The provision of opposed inclinations for the guide slits and the inclined plane effect, for compartively small movements of the threaded spindle, a considerable adjustment of the spring force, so that large adjustment paths are avoided. The inclinations of the plane and the guide slots can be adapted to each other according to the desired conditions. The guide slots and the inclined plane can be provided on structurally simple parts, which permits the screw spindle to be readily connected with the inclined plane. The hinging of the suspension unit and the location of the adjustment arrangements in the region of the front of the seat edge of the seat frame enables the seat base to be positioned towards the rear of the seat frame seen in the seat direction, so that this seat base presents no kind of inconvenience while the adjustment arrangements can be readily covered by the front seat edge, only the milled head of the threaded spindle projecting out of the front seat edge where it can be easily covered by the seat upholstery while remaining in a convenient operating region for the occupant of the seat. A vehicle seat support constructed according to the invention moreover permits a construction of the vehicle seat which can be disposed of at a compartively low level.

In one embodiment of the invention, the guide slots are arranged in the sidewalls of a U-shaped guide element fastened by the cross-piece thereof to the lower surface of the seat frame, and the inclined plane is formed on an adjustment element which is slidingly supported on the cross-piece of the guide element, the adjustment element being movable by means of a threaded sleeve on the threaded spindle which is rotatably journaled at the front edge of the seat frame so as to be held against longitudinal displacement.

The particularly simple construction of the adjustment arrangements in a seat support embodying the invention is particularly worthwhile because only simple profiled parts, made from any suitable material, are used, which parts moreover can be simply mounted on the seat frame and connected together. The upper end of the suspension unit can be positioned easily in the guide slot on each side by means of a suitable bearing bolt. For transferring the rotary movement of the screw spindle to the inclined pane, the simple screw connection with the threaded sleeve suffices which effects a longitudinal movement of the inclined plane.

In order to minimize the frictional forces encountered during the adjustment of the spring force, a plastic anti-friction layer can be arranged between the slidably engaging surfaces of the cross-piece of the guide element and the adjustment element. This aids the reliable abutment of the two components, which can be easily received one into the other by suitable design.

The adjustment of the variable suspension force with the aid of the sloping plane on the adjustment element moreover enables each spring force to be very simply indicated. Thus, an indicating member guided in a slot in the front edge of the seat so as to be visible, can be connected with the adjustment element by means of a connecting flap. Each spring force selected can, therefore, be easily and directly read off from a suitably marked scale on the front edge of the seat.

BRIEF DESCRIPTION OF THE DRAWINGS

The invention will be better understood from the following illustrative description and accompanying drawings. In the drawings

DETAILED DESCRIPTION OF THE DRAWINGS

Figure 1:
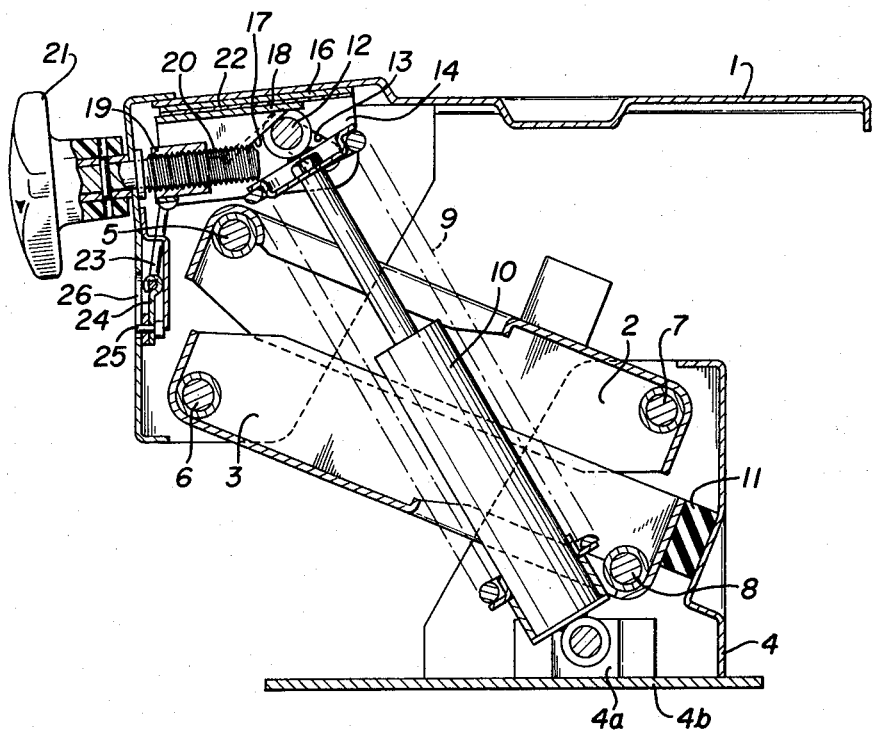
FIG. 1 is a sectional side view of a vehicle seat support embodying the invention, showing the essential parts of the support, namely, the seat frame and the seat base with a parallelogram linkage connecting them.

The illustrated seat frame 1 of the vehicle seat has arranged thereon in known way the upholstered seat portion (not shown), and likewise the back support. The seat frame 1 is pivotally connected with the seat base 4 by means of links 2, 3 which constitute a parallelogram linkage. The upper ends of the two links of the parallelogram linkage are connected to the seat frame 1 by means of pivot pins 5, 6, and the lower ends of the links 1, 3 are pivotally connected to the seat base 4 by means of pivot pins 7, 8. The parallel links 2, 3 are arranged to co-operate with a compression spring 9 and a damping device 10 together forming a suspension unit. FIG. 1 shows the vehicle seat in its upper unloaded position, in which the lower link 3 engages a shock absorbing stop member 11 on the seat base 4.

Figure 2:
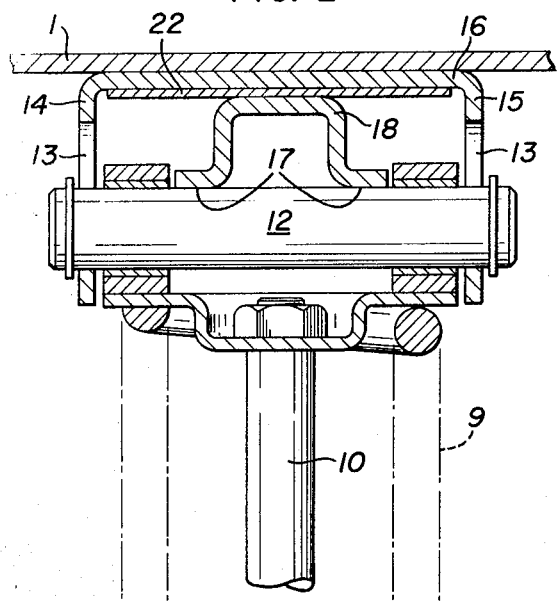
FIG. 2 is a partial sectional view on the line A—A of FIG. 1 showing an adjustment element and a guide element for the suspension unit.

The suspension unit 9, 10 is at its lower end pivotally mounted on a mounting barcket 4a on a base plate 4b, of the seat base 4, and extends, as FIG. 1 shows, through suitably dimensioned apertures in the parallelogram links 2 and 3 which have a shell-like or angle girder construction. At the upper end, the suspension unit 9, 10 is mounted in two parallel guide or bearing slots 13 by means of a bearing pin 12. These guide slots 13, as FIG. 1 shows are arranged in the region of the front seat edge of the seat frame 1 and they extend from this seat edge rearwardly and downwardly at an acute angle to the plane of the seat frame. The guide slots 13 are formed in the sidewalls 14 and 15 of a guide element 16 which is of U-shaped cross-section and is fastened along its cross-piece to the underside of the seat frame 1, as shown in FIGS. 1 and 2.

The end of the suspension unit 9, 10 which is guided in the guide slots 13 is braced against an inclined plane 17 which engages the bearing pin 12. The inclined plane 17 is provided by an adjustment element 18 which is slidingly carried by the guide element 16 and supported on the cross-piece thereof. the adjustment element 18 is provided at the end thereof directed towards the front edge of the seat with an internally threaded sleeve 19 which can be moved longitudinally relative to a threaded spindle 20 received therein by rotation of the latter. The threaded spindle 20 is rotatably journaled in the front edge of the seat frame so as to be secured against longitudinal displacement as shown in FIG. 1.

The spindle 20 has a head 21 which is milled or otherwise shaped to facilitate manual rotation thereof. As can be clearly seen from FIG. 1, by rotation of the spindle 20 by means of the head 21, the adjustment element 18 and thus the inclined plane 17 can be displaced relative to the guide element 16. The plane 17 has an inclination such as to make an acute angle with the plane of the seat frame in a direction opposed to the inclination of the guide slits 13. By displacing the inclined plane 17 from the rest position illustrated in FIG. 1 towards the right, the bearing pin 12 at the upper end of the suspension unit 9, 10 is caused to move in the guide slits 13 rearwardly and downwardly in relation to the front edge of the seat, so that an increased tension of the compression spring 9 results with a consequent increase in the spring force. A selective adjustment of the spring force of the suspension unit 9, 10 is possible over the length of the guide slit 13 by means of a comparatively small adjusting movement effected simply by rotating the head 21 of the threaded spindle 20 located directly at the front edge of the seat.

Figure 3A:
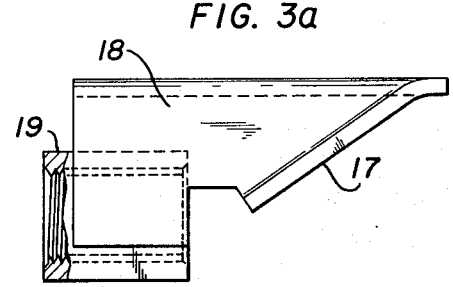
FIGS. 3a and 3b are respectively a side and a plan view of the adjustment element.
Figure 3B:
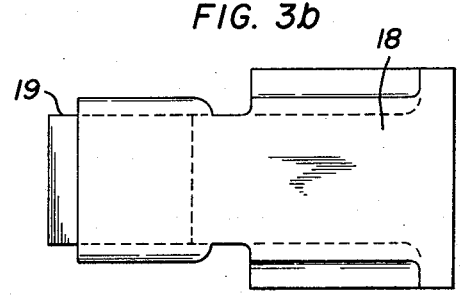

The shape of the adjustment element 18 can be clearly seen from FIGS. 3a and 3b. Both the guide element 16 and the adjustment element 18 are very simple components which can be easily produced. Anti-friction means, in the form of a layer or plate 22 of plastic, for example, polyamide, is arranged between the abutting surfaces of the adjustment element 18 and the guide element 16, that is, on the cross-piece thereof, in order to decrease the frictional resistance to sliding therebetween.

As shown in FIG. 1, an indicating member 24 is carried by the adjustment element by way of a connnection with the threaded sleeve 19 through a joint plate 23, the position of the member being rendered visible through a slit 36 in the front edge of the seat by an indicating pin 25 which is secured to the member. The spring force to which the suspension unit has been set can easily be read off at the front edge of the seat by suitable marks at the edge of the slit 26.

FIG. 1 clearly makes apparent the particularly space-saving and inexpensive construction which the invention affords, in which construction the seat base 4 has been installed towards the rear of the seat frame 1. Apart from the milled head 21, which can be easily covered by the upholstery, no inconvenient or damaging components are located in the actual sitting region. The construction illustrated can, of course, be modified, for example, the lower end of the suspension unit 9, 10 could be hinged to the pivot pin 8 of the lower link 3 on the seat base 4, should this be preferred.

What is claimed is:

1. A seat support adapted for use in a vehicle, comprising
   a base member,
   a seat frame,
   a parallelogram linkage pivotally connected between said base member and said frame for pivotal movement in a fore and aft direction,
   a suspension unit including a spring pivotally connected at its lower end to said base member,
   guide means at the front of said seat frame slotted in a downward and rearward direction to slidably receive the upper end of said suspension unit, and
   adjustment means carried by said seat frame at the front edge thereof for positioning the upper end of said suspension unit at an adjustably selected position in said seat frame, said adjustment means comprising
   a movably mounted adjustment element having an inclined plane surface thereon engaging an upper portion of said suspension unit, and
   a screw spindle journaled in said frame for moving said adjustment element relative to said seat frame.

2. A seat support according to claim 1 wherein said inclined plane surface makes an acute angle with the plane of said seat frame.

3. A seat support according to claim 2 wherein said slotted portion of said seat frame is provided by
   a U-shaped guide element fastened to the lower surface of said frame, and
   said adjustment element is slidably supported by said guide element.

4. A seat support according to claim 3 further comprising
   an anti-friction surface formed of plastic and disposed between the abutting surfaces of said guide element and said adjustment element.

5. A seat support according to claim 1 comprising
   indicator means connected to said adjustment element and visible through a slot in the front of said seat frame for indicating the position of adjustment of said adjustment element.

6. A seat support according to claim 5 wherein said indicator means includes
   at least one indicator mark on said seat frame adjacent said slot, and
   an element slidable in said slot.

* * * * *